United States Patent
Mok

(10) Patent No.: US 7,117,112 B2
(45) Date of Patent: Oct. 3, 2006

(54) METHOD AND SYSTEM FOR THE INTERACTIVE TESTING OF ASSEMBLED WIRELESS COMMUNICATION DEVICES

(75) Inventor: Winston Mok, Scarborough (CA)

(73) Assignee: Research in Motion Limited, Waterloo (CA)

( * ) Notice: Subject to any disclaimer, the term of this patent is extended or adjusted under 35 U.S.C. 154(b) by 0 days.

(21) Appl. No.: 10/945,981

(22) Filed: Sep. 22, 2004

(65) Prior Publication Data
US 2006/0064266 A1    Mar. 23, 2006

(51) Int. Cl.
*G06F 11/00*    (2006.01)
(52) U.S. Cl. .............. 702/117; 702/115; 340/514; 455/423; 714/25; 324/754
(58) Field of Classification Search .............. None
See application file for complete search history.

(56) References Cited

U.S. PATENT DOCUMENTS

| | | | |
|---|---|---|---|
| 6,021,366 A | 2/2000 | Fieramosca et al. | |
| 6,167,401 A * | 12/2000 | Csipkes et al. | 707/10 |
| 6,393,408 B1 | 5/2002 | Mosher et al. | |
| 6,525,657 B1 * | 2/2003 | Wojcik | 340/514 |
| 6,643,798 B1 * | 11/2003 | Barton et al. | 714/25 |
| 2002/0011856 A1 | 1/2002 | Huang et al. | |
| 2002/0099804 A1 | 7/2002 | O'Connor et al. | |
| 2002/0183881 A1 * | 12/2002 | Wright | 700/115 |
| 2003/0027589 A1 * | 2/2003 | Wennemer et al. | 455/550 |
| 2003/0129948 A1 * | 7/2003 | Gab et al. | 455/67.1 |
| 2003/0134631 A1 * | 7/2003 | Snyder et al. | 455/423 |
| 2004/0093109 A1 * | 5/2004 | O'Connor et al. | 700/117 |
| 2004/0093376 A1 * | 5/2004 | De Boor et al. | 709/203 |
| 2004/0102187 A1 * | 5/2004 | Moller et al. | 455/418 |
| 2004/0207422 A1 * | 10/2004 | Lehtinen et al. | 324/758 |
| 2004/0255117 A1 * | 12/2004 | Paatero et al. | 713/166 |

OTHER PUBLICATIONS

European Search Report for European Patent Application No. EP 04104607.9, mailed Jun. 28, 2005.

* cited by examiner

*Primary Examiner*—Carol S. W. Tsai
(74) *Attorney, Agent, or Firm*—Ogilvy Renault LLP

(57) ABSTRACT

A method for testing wireless communication devices in stages in a production line for the assembly of said devices, comprises assembling each respective wireless communication device such that each device includes an interactive test component for interactively testing the device; and testing each device using the interactive test component at an interactive test stage of the production line. The testing maybe performed at the interactive test stage without an external test system. A test result may be stored to the device for storing to an external testing database at a subsequent testing stage and for controlling the performing of subsequent testing.

12 Claims, 6 Drawing Sheets

METHOD AND SYSTEM FOR THE INTERACTIVE TESTING OF ASSEMBLED WIRELESS COMMUNICATION DEVICES

FIELD OF THE INVENTION

This invention relates to the field of testing wireless communication devices, and more specifically, to the testing of fully assembled wireless communication devices.

BACKGROUND

Wireless communication devices, such as cellular phones, personal digital assistants and the like, include microprocessors, input devices including a keypad, special function buttons and wheels, output devices, information storage capabilities, and run one or more software applications. Examples of software applications used in these wireless devices include micro-browsers, address books, and email clients. Additionally, current generations of such devices have access to a plurality of services via the Internet. A wireless device may, for example, be used to browse web sites on the Internet, to transmit and receive graphics, and to execute streaming audio and/or video applications.

Such devices are typically tested during their respective production to ensure reliability and quality control. Once a wireless device is assembled in full plastics (or other material for its shell), it typically progresses through various test stages to qualify each of its components. For mobile cellular devices these tests may include the following: Keys, Internal Mic (microphone), Internal Speaker, Charger, Buzzer, Vibrator, Vision, Radiated RF (radio frequency), etc.

Depending on the initial path of test development, most testing systems execute a series of test stages wherein each stage sequentially executes a subset of tests drawn from a test plan. As development progresses some of these test stages are consolidated depending on the compatibility of function, fixture, or process. For example, consider the following two exemplary testing system flows:

EXAMPLE 1

Stage 1: Keys, Buzzer, Charger, Vibrator, Vision, Current Levels
Stage 2: Internal Mic, Internal Speaker
Stage 3: Radiated RF

EXAMPLE 2

Stage 1: Charger, Vibrator, Vision, Current Levels
Stage 2: Buzzer, Internal Mic, Internal Speaker, Radiated RF Thus, as may be observed from the examples above, there is generally no standard, efficient method for defining test stages along with what tests are executed at any particular stage. In Example 1, the Radiated RF test is performed in a separate Stage 3 whereas in Example 2, the same test is performed in Stage 2.

Traditionally tests have been executed using an external test system coupled to the device under test ("DUT") which external system coordinated the actions of a test operator, the test system and the DUT. Such external systems are coupled and uncoupled at each test stage. There is typically one external test system per each test stage unit. Requiring multiple external systems in a test system of a production line is costly and inefficient. Generally, tests require a relatively small amount of time compared to the time to ready a DUT for testing. Thus for a significant amount of time the external test systems are idle while an operator mounts and dismounts a DUT. As well, each external test system requires maintenance and updating to ensure the external test system has the current configuration for testing the wireless communication devices being produced by the production line.

A need therefore exists for a method and system for efficiently testing fully assembled wireless devices. Accordingly, a solution that addresses, at least in part, the above and other shortcomings is desired.

SUMMARY

According to one aspect of the invention, there is provided a method for testing wireless communication devices in stages in a production line for the assembly of said devices. The method comprises assembling each respective wireless communication device such that each device includes an interactive test component for interactively testing the device; and testing each device using the interactive test component at an interactive test stage of the production line. The testing maybe performed at the interactive test stage without an external test system. A test result may be stored to the device for later storing to an external testing database at a subsequent testing stage and for controlling the performing of subsequent testing.

In accordance with further aspects of the present invention there is provided an apparatus such as a testing system, a method for adapting this system, as well as articles of manufacture such as a computer readable medium having program instructions recorded thereon for practising a method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The present invention provides an on-device interactive test for evaluating components and features of an assembled wireless communication device thereby to replace an external test system to execute such an interactive test. By using a wireless communication device's own resources to perform and store the results of the test, an external test system may be avoided. The interactive test code may be embedded in the device's software and executed by a test operator, for example, upon start up of the device on the production line. Execution of the test may be carried out by the operator using operator activity to interact with the device or upon automated actuation. The test may be terminated and restarted, if desired. Results are stored in a persistent storage of the device and may be later evaluated, for example, at a subsequent test stage, and may also be logged to an external test database at the later test stage. Such a self-contained testing approach is flexible allowing execution at various test stages, whether on or off the production line, and is scalable thus minimizing costs for external test systems.

The interactive test presented herein is particularly suited for testing assembled wireless communication devices that are tested in a two stage test system comprising an interactive test stage and a non-interactive test stage as disclosed in applicant's companion application entitled "A Method And System For Testing Assembled Mobile Devices" filed concurrently herewith and which is incorporated herein by reference. This companion application relates to a method for defining test stages for testing fully assembled wireless communication devices including which tests are to be executed during each particular stage. The method divides testing into two defined test stages. The division between each test stage is determined by the nature of the test. If the test requires physical actuation or mechanical dynamics in order to acquire a measurement, the test is classified as an "interactive" test (i.e., a mechanical test). Any test that does not require physical actuation/mechanical dynamics is classified as a "non-interactive" test (i.e., a non-mechanical test). This categorization of test type divides testing into two defined stages: the interactive test stage and the non-interactive test stage.

Figure 5:
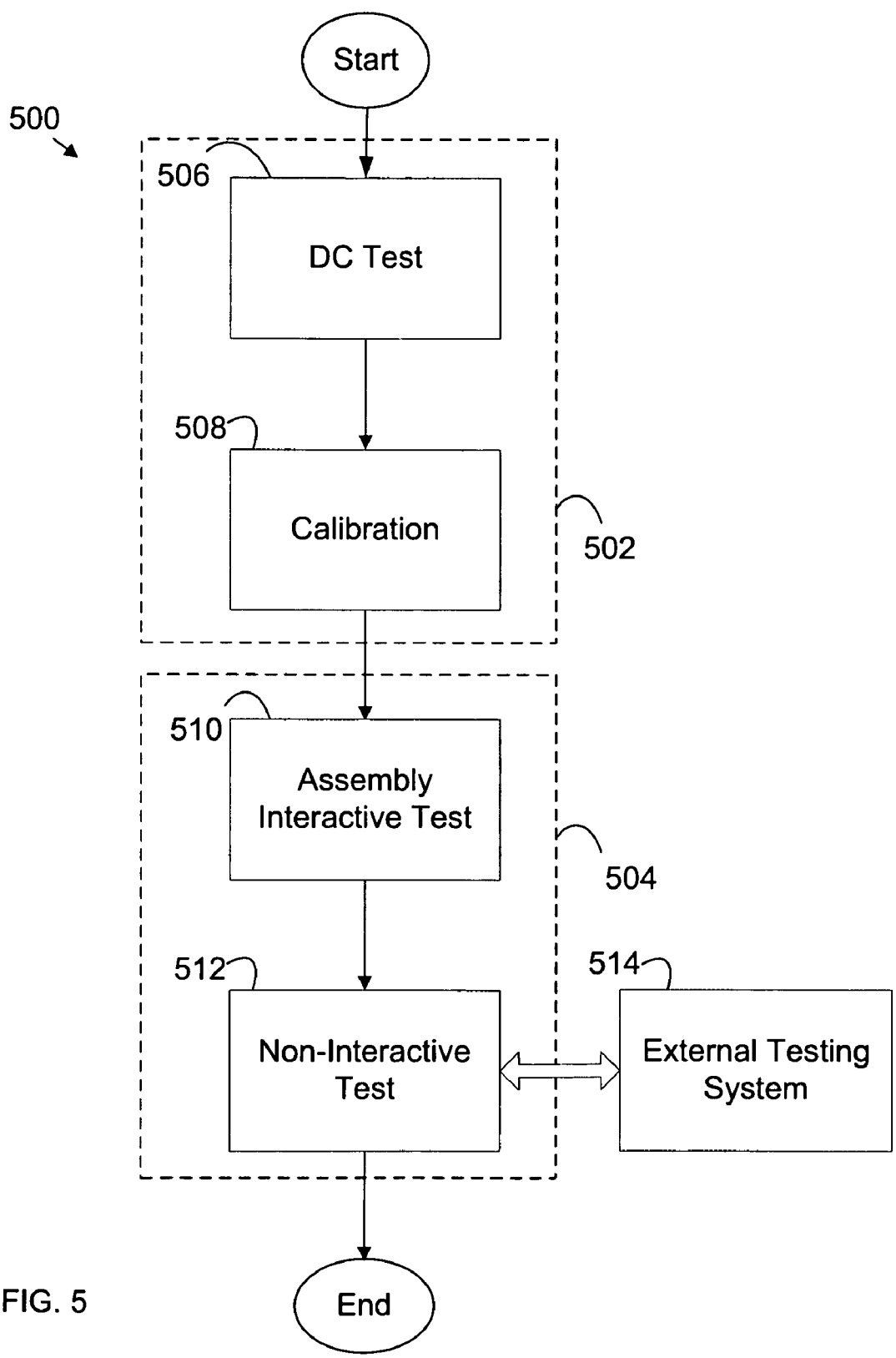
FIG. 5 is a block diagram of a test system on a production line in accordance with an embodiment of the invention.

FIG. 5 illustrates an embodiment of such a test system and method 500 for testing wireless devices in accordance with an embodiment of the invention. As in a conventional wireless communication device testing system, testing may be divided into a board level testing phase 502 and fully assembled ("ASY") level testing phase 504. The board level phase 502 may include a DC test 506 and a calibration test 508 e.g. to calibrate RF power. During the ASY level of testing, wireless communication devices are assembled and processed through a series of functional, RF, and audio tests. Heretofor each conventional test stage in phase 504 usually required its own test fixture and external test system. Often such tests were done in three stages as follows: assembly, MFT (i.e. Multi-Functional Test), and final/audio testing (or RF+Audio).

In accordance with an embodiment of the present invention, ASY test phase 504 need only include two test stages: assembly+interactive test 510 and non-interactive test 512. By classifying ASY test phase tests 504 as either interactive 510 or non-interactive 512, the testing process can be reorganized based on the physical interaction requirements of the tests. A single external testing system 514 may be employed.

The assembly+interactive testing 510 test stage is where each interactive component of the assembled device (typically user input devices such as keyboard or keypad keys, special buttons and wheels or other such manually manipulated input devices) are tested for operation. An additional interactive test may include a holster test testing the action of holstering a device, as applicable. This activity of holstering may be sensed by the device and used to trigger one or more responses such as a power saving response or to set a state of the device useful for user notification profiles.

The non-interactive testing 512 test stage includes all non-interactive tests which are performed at a single test station. The design of the test station for performing non-interactive testing 512 includes minimal mechanical requirements. The test station for this testing includes external testing system 514 which is coupled to a test pad (not shown) which is in turn adapted to receive a test palette (not shown) which holds the wireless communication device.

An advantage of grouping interactive tests into a single stage is that mechanical dynamics can be concentrated in one test fixture. In a complete testing system, this concentration minimizes the total number of drivers/actuators used since all moving parts are tested in one of the two test stages.

An advantage of grouping non-interactive tests into a single stage is that, theoretically, no mechanical dynamics need be designed into the test fixture for this stage. Mechanical dynamics in fixturing can cause unwanted variability due to changes in physical characteristics (i.e., actuators, moving cameras, etc.). By removing the mechanical dynamics in a test fixture, an increase in reproducibility and repeatability of measurements can be achieved. This improves the efficiency of testing.

Figure 1:
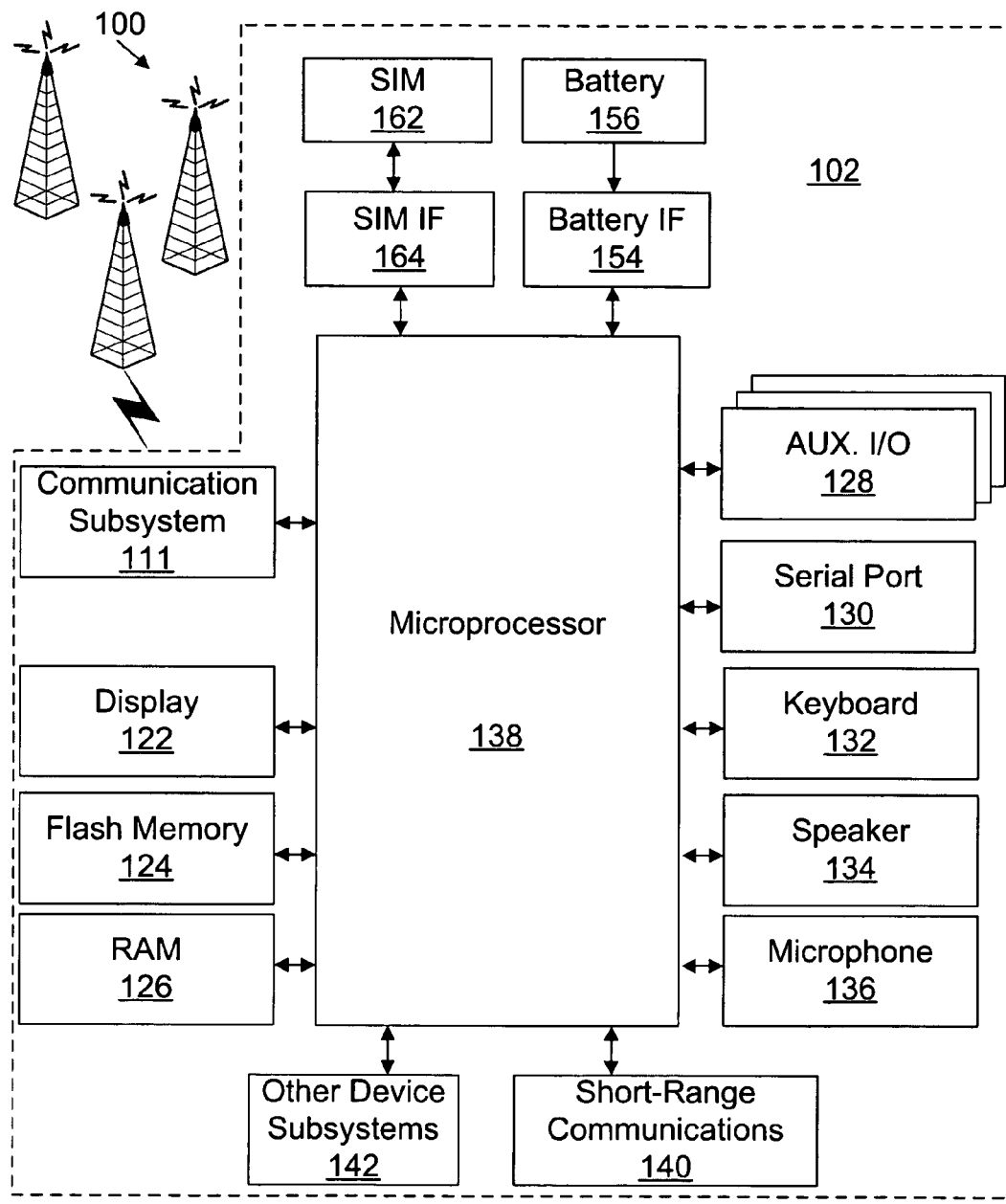
FIG. 1 is a block diagram of a preferred wireless communication device adapted for implementing an embodiment of the invention.

FIG. 1 is a block diagram of a example wireless communication device 102 adapted in accordance with an embodiment of the invention. Device 102 is a two-way communication device having at least voice and advanced data communication capabilities, including the capability to communicate with other computer systems. Depending on the functionality provided by device 102, it may be referred to as a data messaging device, a two-way pager, a cellular telephone with data messaging capabilities, a wireless Internet appliance, or a data communication device (with or without telephony capabilities). Device 102 may communicate with any one of a plurality of fixed transceiver stations 100 within its geographic coverage area.

Device 102 will normally incorporate a communication subsystem 111, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 111 depends on the communication network in which device 102 is intended to operate.

Network access is associated with a subscriber or user of device 102 and therefore device 102 requires a Subscriber Identity Module or "SIM" card 162 to be inserted in a SIM IF 164 in order to operate in the network. Device 102 is a battery-powered device so it also includes a battery IF 154 for receiving one or more rechargeable batteries 156. Such a battery 156 provides electrical power to most if not all electrical circuitry in device 102, and battery IF 154 provides for a mechanical and electrical connection for it. The battery IF 154 is coupled to a regulator (not shown) which provides power V+ to all of the circuitry.

Device 102 includes a microprocessor 138 which controls overall operation of device 102. Communication functions, including at least data and voice communications, are performed through communication subsystem 111. Microprocessor 138 also interacts with additional device subsystems such as a display 122, a flash memory 124 or other persistent store, a random access memory (RAM) 126, auxiliary input/output (I/O) subsystems 128, a serial port 130, a keyboard 132, a speaker 134, a microphone 136, a short-range communications subsystem 140, and any other device subsystems generally designated at 142. Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list. Operating system software used by microprocessor 138 is preferably stored in a persistent store such as flash memory 124, which may alternatively be a read-only memory (ROM) or similar storage element (not shown). Those skilled in the art will appreciate that the operating system, specific device applications, or parts thereof, may be temporarily loaded into a volatile store such as RAM 126.

Microprocessor 138, in addition to its operating system functions, preferably enables execution of software applications on device 102. A predetermined set of applications which control basic device operations, including at least data and voice communication applications, will normally be installed on device 102 during its manufacture. A preferred application that may be loaded onto device 102 may be a personal information manager (PIM) application having the ability to organize and manage data items relating to the user such as, but not limited to, instant messaging (IM), e-mail, calendar events, voice mails, appointments, and task items. Naturally, one or more memory stores are available on device 102 and SIM 162 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on device 102 with respect to such items. This is especially advantageous where the host computer system is the mobile station user's office computer system. Additional applications may also be loaded onto device 102 through network 100, an auxiliary I/O subsystem 128, serial port 130, short-range communications subsystem 140, or any other suitable subsystem 142, and installed by a user in RAM 126 or preferably a non-volatile store (not shown) for execution by microprocessor 138. Such flexibility in application installation increases the functionality of device 102 and may provide enhanced on-device functions, communication-related functions, or both. For example, secure communication applications may enable electronic commerce functions and other such financial transactions to be performed using device 102.

In a data communication mode, a received signal such as a text message, an e-mail message, or web page download will be processed by communication subsystem 111 and input to microprocessor 138. Microprocessor 138 will preferably further process the signal for output to display 122 and/or to auxiliary I/O device 128. A user of device 102 may also compose data items, such as e-mail messages, for example, using keyboard 132 in conjunction with display 122 and possibly auxiliary I/O device 128. Keyboard 132 is preferably a complete alphanumeric keyboard and/or telephone-type keypad. These composed items may be transmitted over a communication network through communication subsystem 111 or short range communication subsystem 140.

For voice communications, the overall operation of device 102 is substantially similar, except that the received signals would be output to speaker 134 and signals for transmission would be generated by microphone 136. Alternative voice or audio I/O subsystems, such as a voice message recording subsystem, may also be implemented on device 102. Although voice or audio signal output is preferably accomplished primarily through speaker 134, display 122 may also be used to provide an indication of the identity of a calling party, duration of a voice call, or other voice call related information, as some examples.

Serial port 130 in FIG. 1 is normally implemented in a personal digital assistant (PDA)-type communication device for which synchronization with a user's desktop computer is a desirable, albeit optional, component. Serial port 130 enables a user to set preferences through an external device or software application and extends the capabilities of device 102 by providing for information or software downloads to device 102 other than through a wireless communication network. The alternate download path may, for example, be used to load an encryption key onto device 102 through a direct and thus reliable and trusted connection to thereby provide secure device communication.

Short-range communications subsystem 140 of FIG. 1 is an additional optional component which provides for communication between device 102 and different systems or devices, which need not necessarily be similar devices. For example, subsystem 140 may include an infrared device and associated circuits and components, or a Bluetooth™ communication module to provide for communication with similarly-enabled systems and devices. Bluetooth™ is a registered trademark of Bluetooth SIG, Inc.

Figure 2:
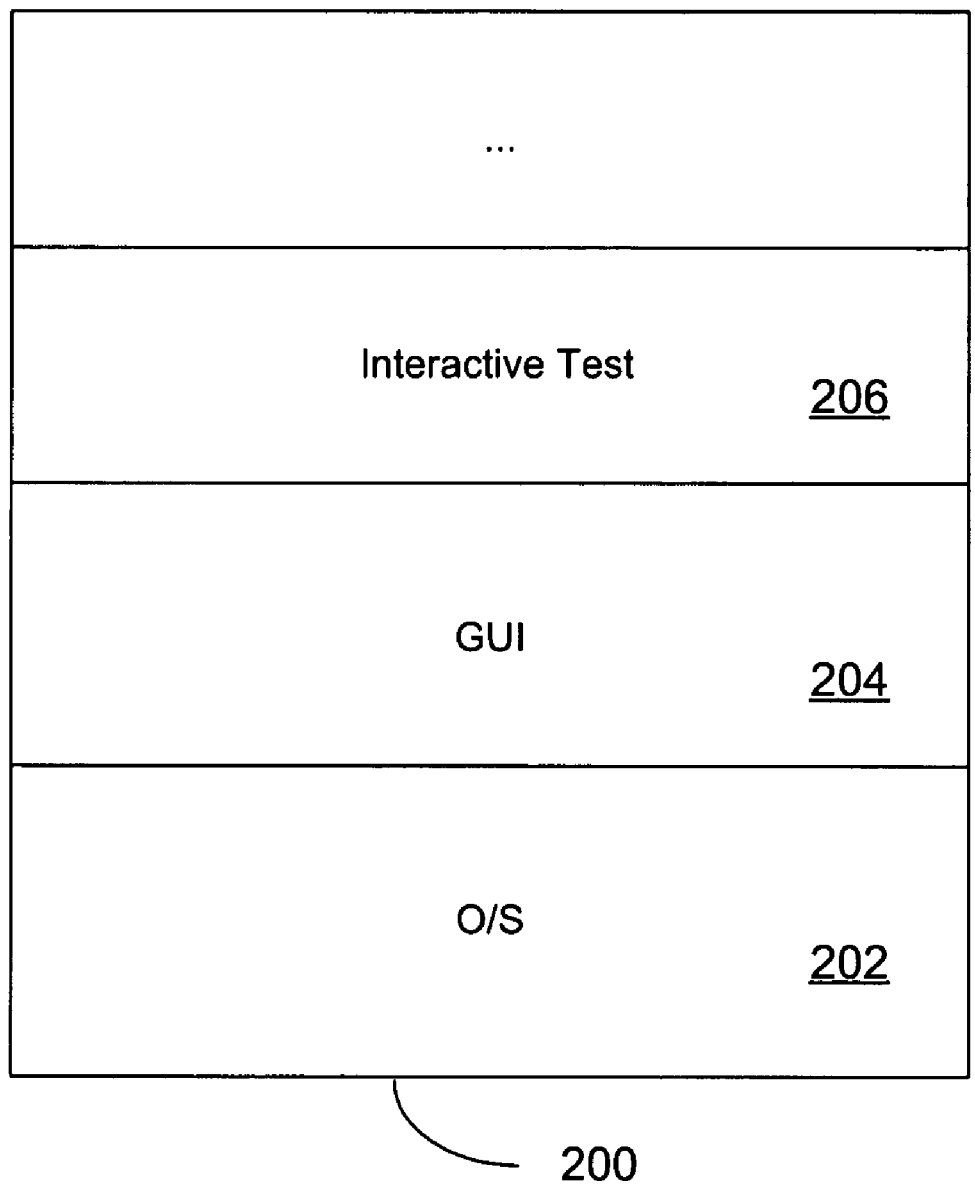
FIG. 2 is a schematic diagram of a memory portion of FIG. 1 in accordance with an embodiment of the invention.

Referring now to FIG. 2, there is an illustration of a memory 200 of device 102, in accordance with an embodiment of the invention, showing various software components for controlling device 102. Memory 200 may be flash memory 124, RAM 126 or a ROM (not shown), for example. In accordance with an embodiment of the invention, device 102 is intended to be a multi-tasking wireless communications device configured for sending and receiving data items and for making and receiving voice calls. To provide a user-friendly environment to control the operation of device 102, an operating system (O/S) 202 resident on station 102 provides a basic set of operations for supporting various applications typically operable through a graphical user interface (GUI) 204. For example, O/S 202 provides basic input/output system features to obtain input from Auxiliary I/O 108, keyboard 132 and the like and for facilitating output to the user. In accordance with an embodiment of the invention, there is provided an interactive test application 206 for testing the assembled device 102 such has during an ASY test phase stage of a production line test system.

Though not shown, one or more applications for managing communications or providing personal digital assistant like functions may also be included.

Figure 3A:
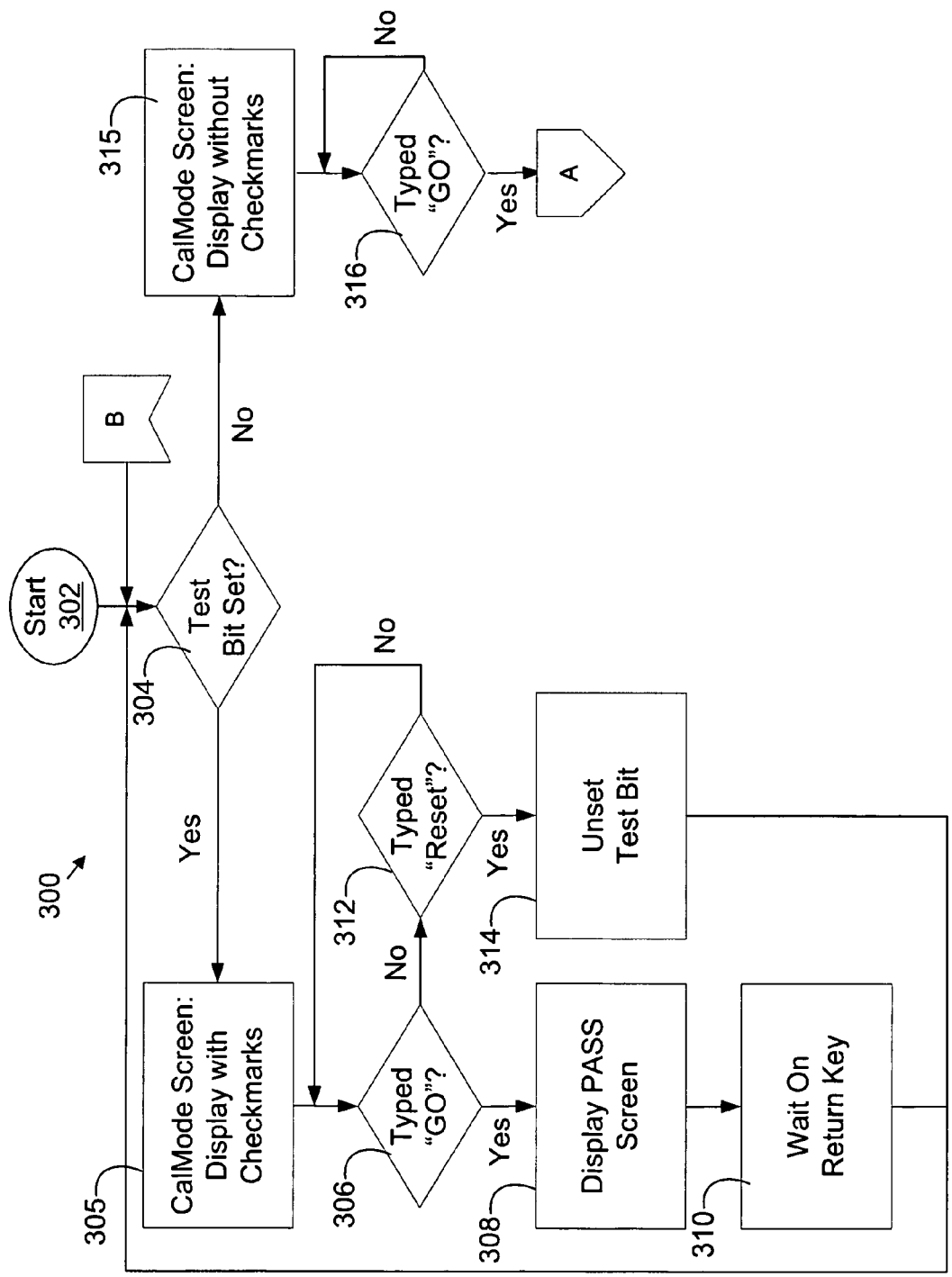
FIGS. 3A and 3B are a flow chart illustrating a method for testing a wireless device in accordance with an embodiment of the invention.
Figure 3B:
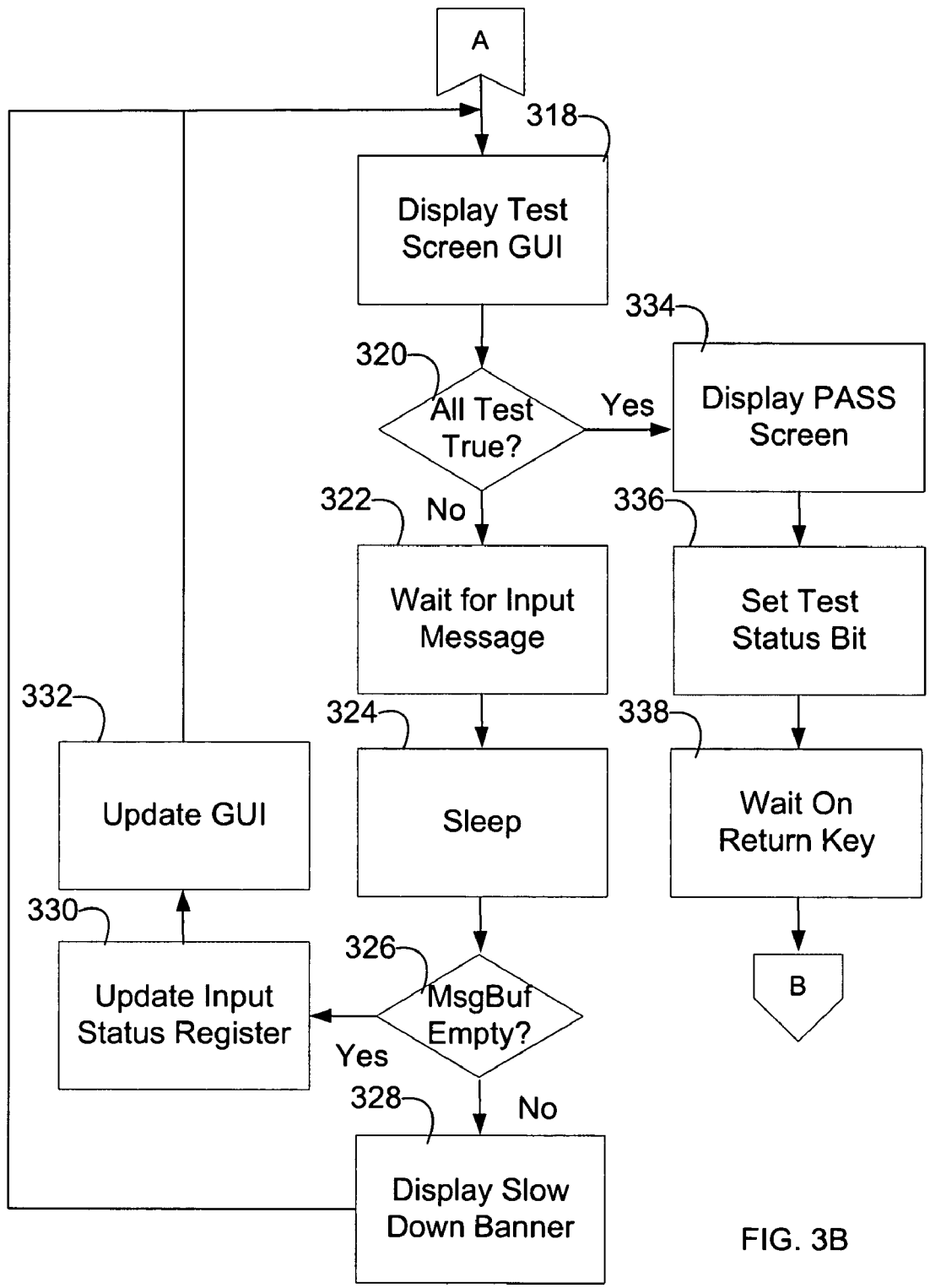

FIGS. 3A and 3B comprise a flowchart of operations 300 for an embodiment of interactive test 206. Interactive test operations 300 working with a GUI such as GUI 204 of the device provide a human operator on a production line for assembling and testing a wireless communication device with an interface to interactively test the wireless communication device and store the test results to a storage device (e.g. flash memory 124 or other store) of the device. Operations 300 start (step 302) for example upon power up of the DUT on the production line.

At step 304, a determination is made whether the DUT has passed the interactive tests. For example, a predetermined test bit may be examined. If this bit is set (i.e. the test was successfully completed) operations continue at step 305 otherwise operations continue at step 315. At step 305, the GUI is invoked and a display screen displayed (e.g. Calibration Mode (CalMode) Screen) showing checkmarks in association with each interactive test to indicate a successful completion to the interactive tests. Following to steps 306, a response from the operator is required to continue.

If the operator inputs "GO" via keyboard 132 a Pass screen is displayed (step 308) until the operator presses the keyboard's Return Key (step 310). Operations thereafter loop back to step 304. If the operator does not input "GO" at step 306 but inputs "RESET" (step 312), the test bit is unset to re-start the interactive testing and operations thereafter loop back to step 304. Only "GO" and "RESET" may be input to continue beyond steps 306 and 312.

If at step 304 it is determined that the interactive tests are not completed, at step 315 the GUI is invoked and a display screen displayed showing the interactive tests to be performed without checkmarks in association with each interactive test to indicate a test start-up. A "GO" input from the operator is required to continue beyond step 316. If the operator inputs "GO" via keyboard 132 at step 318 (FIG. 3B) a test screen is displayed and the portion of the interactive tests requiring operator activity to actuate the device components to be tested commences. In the present embodiment, tests are performed individually in a loop fashion. At step 320, a determination is made as to whether all tests are complete. If so, operations continue at step 334 and otherwise progress to step 322.

An operator activity or input is required and the operations 300 wait on an input which in the present embodiment is communicated via a message in a message buffer (not shown). At step 324 operations sleep or pause for a predetermined time (e.g. 70 ms) and a second check of the message buffer is made to determine whether another message was received within the predetermined period. If a second message is available in the buffer so quickly, there is an indication that the DUT may not be operating properly, for example, due to an electrical short that appears as a second input when a single key or other individual input device is only actuated once. Alternatively an operator may be interacting with the device too quickly, pressing more than one key at a time, which is indistinguishable from an error. At step 326, a determination is made whether a second message is available (i.e. message buffer is not empty). If so, operations continue to step 328 and a "SLOW DOWN" banner is displayed in association with the test screen. Operations loop to step 318 for further testing.

If the message buffer is empty at step 326, the message received at step 322 is evaluated and an appropriate test status register is updated (step 330) to record the test. This register may be stored for future use (not shown). At step 332, the test screen is updated to reflect the test result and operations loop to step 318 to redraw the screen and continue the tests.

If at step 320, a determination is made that all tests are complete, operations continue at step 334 and a PASS screen is displayed indicating to the operator that the interactive tests are completed and activities at this stage may be concluded. The predetermined test bit is set for later use (step 336). Operations wait for a user to press the Return key (step 338) and loop back to step 302 (FIG. 3A) and thereafter through to step 306 where the successful test screen with checkmarks is displayed providing an opportunity to restart the test if desired. Operations 300 may be ended by powering down the DUT, such as by removing its battery 156.

With reference again to production line flow chart 500 of FIG. 5, a DUT typically moves from assembly interactive test stage 510 to non-interactive stage 512. Typically, the DUT is fitted to a test fixture (not shown) for performing the non-interactive tests during stage 512. Non-interactive test stage 512 usually involves an external testing system 514 for managing and performing the test operations and recording their results. As is well known, a user may interact with the external testing system and its software modules using this system's GUI. External testing system 514 is coupled to the DUT via the test fixture which has one or more cooperating interfaces to the DUT's communication interfaces such as its serial port 130, short range communications interface 140, etc.

Figure 4:
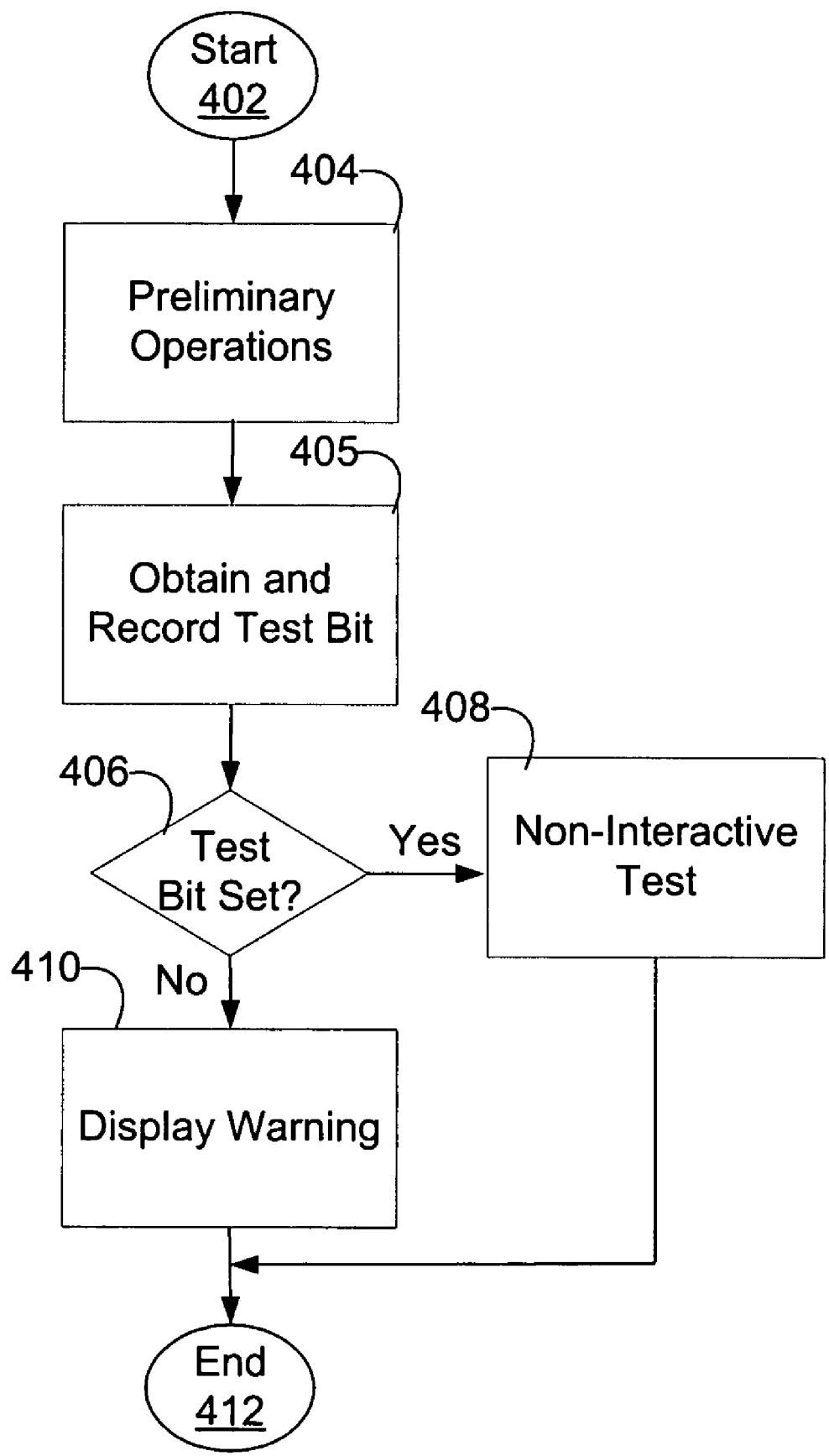
FIG. 4 is a flow chart illustrating a method for testing a wireless device in accordance with an embodiment of the invention.

FIG. 4 is a flow chart of operations 400 for the non-interactive testing of a device in the production line. Such operations 400 may be performed by a operator using an external testing system such as system 514. In accordance with an embodiment of the invention, the operation of the external test system 514 may be regulated by the success or failure of the interactive tests at stage 510. Operations 400 begin (step 402), for example, by invoking a software application (not shown) on external test system 514. At step 404, preliminary operations to the non-interactive tests are performed. Data identifying the DUT may be entered by the operator or otherwise received (e.g. by a bar code input device (not shown)) for recording in association with the interactive and non-interactive test results. Operator information, DUT configuration information, etc. may be obtained and recorded for the DUT, for example, to a local and/or remote database (not shown) coupled to the external testing system 514. At step 405 the interactive test bit is obtained from the DUT, for example, via OS 202 or interactive test application software 206 and recorded to the test database. At step 406, the test bit status is evaluated to determine whether an interactive test successfully completed. If so, operations continue to step 408 where non-interactive tests commence and thereafter operations end at step 412. Otherwise, at step 410, a warning (or error) alert message is displayed to the operator on external testing system 514 and thereafter operations end at step 412. Non-interactive testing is thus prevented in accordance with the results of the interactive testing. The DUT may be returned to interactive test stage 510 for completion of an interactive test or otherwise dealt with in accordance with a testing protocol. Though not shown, external testing system 514 may advise the operator of the particular options and direct the subsequent action. For example, one course of action may be to confirm the DUT configuration information to ensure the external testing system is obtaining the proper interactive test bit data. Another course of action may be to perform the interactive test at the non-interactive test stage 512 and to re-do steps 405 and following of operations 400.

Though the interactive test application is described in relation to a production line environment, the software may be resident on the device at any time. It may be useful for field tests or for evaluating the device before or after a repair. Persons of ordinary skill in the art will appreciate that such software may be stored in a variety of computer readable media as well, whether on or off the device, to facilitate development and distribution for example.

While the results of the interactive test are useful as a pre-requisite to the non-interactive tests, a person of ordinary skill in the art will appreciate that the non-interactive test may proceed without a successful interactive test, for example, either with or without a warning to the operator.

The embodiments of the invention described above are intended to be exemplary only. The scope of the invention is therefore intended to be limited solely by the scope of the appended claims.

I claim:

1. A method for testing wireless communication devices in stages in a production line for the assembly of the devices, comprising the steps of:
    assembling the wireless communication devices such that each device includes an interactive test component for interactively testing the device;
    testing each device using the interactive test component at an interactive test stage of the production line;
    storing a respective result of interactive testing to each device; and
    accessing the respective result from each device at a non-interactive test stage of the production line for non-interactive, testing of the devices, the non-interactive testing comprising non-mechanical testing without physical actuation or mechanical dynamics being performed on the devices.

2. The method of claim 1, wherein the interactive testing is performed at the interactive test stage without an external test system.

3. The method of claim 1, further comprising accessing the respective result from each device at a the non-interactive test stage for storing to an external testing database.

4. The method of claim 1, further comprising coupling each device to an external testing system for performing at least one of storing and non-interactive testing.

5. The method of claim 4, wherein the coupling includes coupling each device to a test fixture for coupling to the external testing system, the fixture comprising no mechanical dynamics for actuating the wireless communication devices.

6. A method of testing assembled wireless communications devices in a production line comprising:
    receiving an assembled wireless communications device in the production line for testing in accordance with a plurality of tests comprising a) one or more interactive tests each requiring a physical actuation or mechanical dynamics to perform the interactive test and b) one or more non-interactive tests comprising non-mechanical tests without physical actuation or mechanical dynamics to be performed on the devices;
    at an interactive test stage,
        performing each of the interactive tests using an interactive test component assembled into device;
        storing a result of the interactive tests to the device; and
        accessing the result stored to the device for at least one of storing to an external testing database and controlling the non-interactive tests.
    at a non-interactive test stage, performing the non-interactive tests.

7. The method of claim 6, further comprising coupling the device to an external testing system for performing the non-interactive tests.

8. The method of 7, further comprising storing a result of the interactive test to an external testing database.

9. A production line testing system for testing wireless communication devices during assembly, comprising:
    an interactive test stage in a production line for interactively testing assembled wireless communication devices, said devices assembled to have an interactive testing component operable to interactively test said devices without an external testing system; and
    a non-interactive, test stage in the production line for non-interactively testing assembled wireless communication devices without physical actuation or mechanical dynamics being performed on the devices.

10. The production line testing system of claim 9, wherein the non-interactive test stage comprises an external testing system for performing the non-interactive tests.

11. The production line testing system of claim 10, wherein the external testing system is responsive to a test result of the interactive test stage.

12. A wireless communication device comprising an interactive test component for interactively testing the device, wherein the interactive test component stores a result of the interactive testing for at least one of subsequent storing to an external testing database and controlling subsequent non-interactive testing of the device, the non-interactive testing comprising non-mechanical tests without physical actuation or mechanical dynamics being performed on the device.

* * * * *